US006956818B1

(12) United States Patent  
Thodiyil

(10) Patent No.: US 6,956,818 B1  
(45) Date of Patent: Oct. 18, 2005

(54) METHOD AND APPARATUS FOR DYNAMIC CLASS-BASED PACKET SCHEDULING

(75) Inventor: John A. Thodiyil, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/510,905

(22) Filed: Feb. 23, 2000

(51) Int. Cl.[7] .............................................. H04L 12/54
(52) U.S. Cl. ................... 370/230; 370/235; 370/395.4; 370/395.42; 370/412; 370/429; 709/240; 710/40; 711/151; 711/158
(58) Field of Search .................. 370/395.4–395.43, 370/412, 417, 419–421, 389, 415, 381, 230, 370/235, 429; 710/22, 23, 25, 28, 34, 39–41, 710/51, 52, 20, 29, 36; 709/238, 240; 711/147, 711/150, 151, 154, 158

(56) References Cited

U.S. PATENT DOCUMENTS

| 5,732,094 A | * | 3/1998 | Petersen et al. ............... 710/52 |
| 5,751,951 A |   | 5/1998 | Osborne et al. |
| 5,844,890 A | * | 12/1998 | Delp et al. ................... 370/412 |

(Continued)

FOREIGN PATENT DOCUMENTS

| EP | 0 710 046 A2 | 5/1996 |
| WO | WO 99/00949 A1 | 1/1999 |

OTHER PUBLICATIONS

Shreedhar, et al., Efficient Fair Queuing Using Deficit Round Robin, Computer Communications Review, Association For computing Machinery, New York, US, vol. 25, No. 4, Oct. 1, 1995, pp. 231-242.

(Continued)

Primary Examiner—Alpus H. Hsu  
Assistant Examiner—Justin M Philpott  
(74) Attorney, Agent, or Firm—Park, Vaughan & Fleming LLP

(57) ABSTRACT

A method and apparatus are provided for scheduling data for transmission over a communication link shared by multiple applications operating on a host computer. The apparatus incorporates multiple storage components, with each storage component configured to store descriptors of data having one of multiple priorities. Each descriptor identifies a location (e.g., in host computer memory) of a portion of data to be included in a packet transmitted over the communication link. The apparatus services each storage component in turn to retrieve one or more descriptors, identify their associated data, retrieve the data and prepare it for transmission. Each storage component has an associated weight, which may be proportional to the priority of data represented by descriptors stored in the component. A storage component's weight may indicate a portion of the transmission bandwidth or a maximum amount of data that may be scheduled for transmission each time the component is serviced. The weights are dynamic and may be updated during operation of the apparatus in order to alter the amount of data that may be transmitted during one of a storage component's turn at being serviced. If a weight is changed, servicing of the storage components restarts with the storage component associated with the highest priority data. If more data is scheduled for transmission during a servicing turn than indicated by the weight of the serviced component, a deficit is formed for that component. The deficit serves to decrease the maximum amount of data that may be scheduled during a succeeding turn for the component. When a weight is changed, a deficit may be reset to zero.

29 Claims, 4 Drawing Sheets

U.S. PATENT DOCUMENTS 6,094,435 A * 7/2000 Hoffman et al. ............. 370/414
6,490,248 B1 * 12/2002 Shimojo ................ 370/395.42
6,490,640 B1 * 12/2002 Johansson ..................... 710/52
6,721,273 B1 * 4/2004 Lyon .......................... 370/235

OTHER PUBLICATIONS

Saha, et al. Carry-Over Round Robin: A Simple Cell Scheduling Mechanism for ATM Networks, IEEE/ACM Transactions on Networking, IEEE Inc., New York, US, vol. 6, No. 6, Dec. 1998, pp. 779-796.

* cited by examiner

METHOD AND APPARATUS FOR DYNAMIC CLASS-BASED PACKET SCHEDULING

BACKGROUND

This invention relates to the field of computer system communications. More particularly, a method and apparatus are provided for dynamic, adaptive and preemptive scheduling of data for transmission over a communication link, based on different classes of service desired for different data.

In a computer system operating multiple applications and/or utilities, it is often desirable to provide different qualities or priorities of service for data generated by the different programs. Where the data is to be transmitted to another computer system, for example, one type or class of data may be more sensitive to processing delays than another. Data of this type may thus be assigned a relatively high priority or quality of service. For example, a real-time application executing on one computer may rely on a steady feed of audio or visual data from another computer system, without which a degradation in performance will be very apparent. In contrast, data destined for an electronic mail application may be delayed without having a significant or even noticeable impact.

A host computer system operating multiple applications and generating data to be transmitted to one or more connected computer systems often possesses only a single communication link that must be shared by the applications. All outgoing traffic must therefore pass through the one connection, or port, regardless of the priority or quality of service that is desired for the information. Because the one port acts as a potential choke point, it becomes more difficult to ensure the desired level of service for each type of information.

Present methods of prioritizing outgoing information (e.g., for servicing by a processor or processing through a network protocol stack) generally involve software solutions. These types of methods may, for example, affect the order in which outgoing data are transferred from a host computer to a device (e.g., a network interface circuit or card (NIC)) that controls the communication link. For example, information/data from different applications may be placed in different host queues and passed to the device according to a schedule that allocates more resources (e.g., processor time) to one type or class of information than another.

Such methods are inadequate. In particular, these schemes simply serve to move potential congestion from the interface between the host computer and the communication interface device to the device itself. For example, when outbound data (e.g., packets) are received at a NIC, the traffic is typically processed and dispatched in the order received, regardless of the quality of service that was desired or assigned to the data by the host computer. Software mechanisms on the host can only affect the order in which outgoing data are received at its communication device. And, although the host computer may be able to monitor the level of outgoing data within each of its outgoing queues, it cannot directly monitor any congestion within the device. This necessarily limits the manner and effectiveness with which a host computer can alleviate congestion and enforce desired qualities of service.

More particularly, data transmission schemes that rely on software methods of providing quality of service do not permit the preemption of outgoing data after the data are transferred to a communication interface device. Therefore, if a plethora of relatively low-priority data has been transferred to the device, followed by high-priority data, the lower-priority data cannot be preempted even if necessary to ensure the necessary quality of service for the high-priority data. Enabling such preemption in the communication device would allow qualities of service, to be more accurately enforced. As a result, network traffic (e.g., real-time data) requiring timely transfer to the network would be more likely to have its requirements satisfied.

Thus, what is needed is a method and apparatus for providing a hardware-based system for queuing or scheduling packets for transmission over a communication link shared by multiple applications operating on a host computer system. Advantageously, such a method may be implemented in the host's communication device, such as a network interface circuit or card. In addition, it is desirable to allow dynamic alteration of priorities or the criteria affecting the quality of service to be afforded to different classes of data.

SUMMARY

In one embodiment of the invention a method and apparatus are provided for transmitting packets over a shared communication link on the basis of priorities or classes of service assigned to the packets. In one embodiment the apparatus serves as a network interface circuit or card (NIC) for interfacing a host computer system to a network.

In one embodiment of the invention weights are dynamically assigned to packets of information to be transmitted over the network. The assigned weights indicate a class or service or priority to be afforded to the packets. In particular, the weights may indicate a portion or percentage of the available communication bandwidth to be granted to each class of packets. Alternatively, the weights may be configured to indicate an amount of data (e.g., number of bytes or packets) of one class that may be transmitted before another class is serviced. In this embodiment multiple caches or other memory structures are maintained on the apparatus, wherein each cache is configured for a different priority or class of service.

Thus, in one method of operation the apparatus receives descriptors of outbound packets from a host computer (e.g., a device driver configured in accordance with an embodiment of the invention). Illustratively, each descriptor identifies a packet or a portion of a packet stored in host memory. When a descriptor is received at the apparatus, it is placed into a cache corresponding to the priority assigned to the associated packet.

Each cache is then serviced in turn, according to its associated weight. When a cache is being serviced, descriptors are removed from it in the order they were received. The packet(s) associated with the descriptors are retrieved from host memory and forwarded for transmission over the communication link. In one embodiment, when an amount of data (e.g., number of packets or bytes) corresponding to the cache's weight is forwarded for transmission, the next cache may be serviced.

In a present embodiment, a service turn for a cache will not be terminated in the middle of a packet. In particular, each descriptor within a cache may correspond to only a portion of a data packet and, even if the service turn would otherwise end after a particular descriptor (e.g., because of the cache weight), the turn is extended (e.g., and more descriptors processed, if necessary) until all of the data of the last packet is transmitted or scheduled for transmission. If, however, the amount of data transmitted or scheduled for transmission during a service turn exceeds a predetermined amount (e.g., proportional to the cache weight), a deficit is noted for the cache. When a cache has a non-zero deficit, the amount of data that may be transmitted or scheduled for transmission during a later service turn for the cache is decreased. As a result, a predetermined allocation of communication bandwidth between different classes or priority of data may be closely approximated over time.

In one embodiment of the invention weights associated with the packets and the descriptor caches on the apparatus may be dynamically modified. For example, if packets associated with a relatively high priority or class of service are not being serviced rapidly enough, cache weights may be adjusted to favor the high priority packets, possibly at the expense of packets having lower priorities.

DETAILED DESCRIPTION

Figure 1:
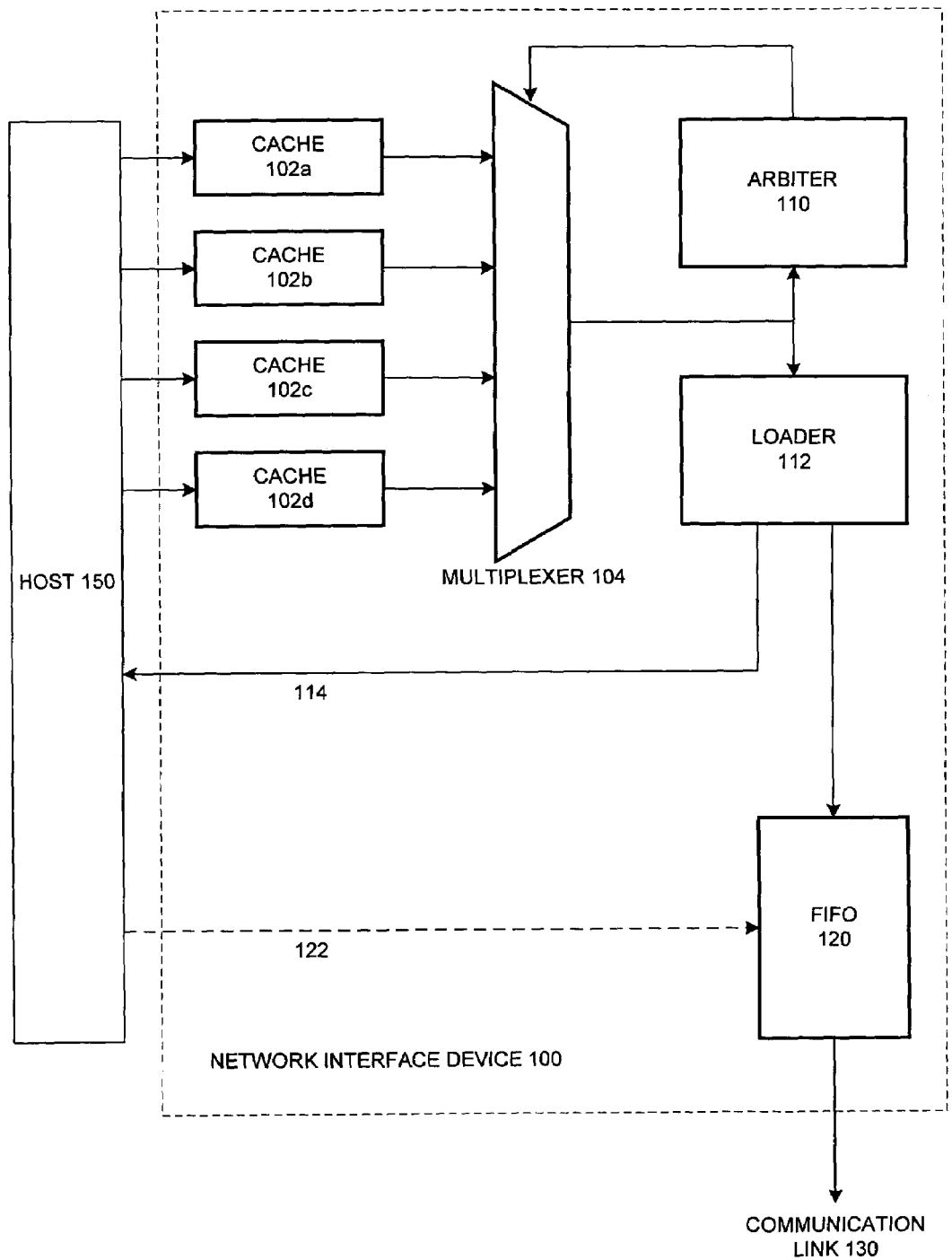
FIG. 1 is a block diagram depicting a device for scheduling data packets having different priorities for transmission over a communication link in accordance with an embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, display) are omitted for the sake of clarity.

In particular, embodiments of the apparatus described below are configured to receive, from a host computer system, data to be transmitted to a shared communication link such as a network, modem or other device. The data has associated priorities or qualities of service assigned by the host computer. Various methods of operating the apparatus are described in which information is transmitted or scheduled for transmission in accordance with the different priorities or qualities of service requested or required for the data.

It should be understood that the techniques of the present invention might be implemented using a variety of technologies. For example, the methods described herein may be implemented in hardware utilizing a combination of microprocessors or other specially designed application specific integrated circuits, programmable logic devices, or various combinations thereof. In particular, the methods described herein may be implemented by a series of computer-executable instructions residing on a storage medium such as a carrier wave or computer-readable storage device. Exemplary forms of carrier waves may take the form of electrical, electromagnetic or optical signals conveying digital data streams along a local network or a publicly accessible network such as the Internet.

Introduction

In one embodiment of the invention a communication device such as a network interface circuit or card (NIC) is provided for interfacing a host computer system to a communication link (e.g., a network). All communications (e.g., data) that are to be transmitted from a host computer system across the link traverse the NIC. The NIC is configured to accept and recognize multiple classes of information from the host computer. The term priority or quality of service may be used herein to refer to a priority, class or quality of service requested for, desired for, or assigned to a set of data submitted by the host computer system for transmission across the communication link. Methods of the invention described below are compatible with both full and half duplex communications.

In this embodiment data received from the host computer system is segregated according to its priority (which may be assigned by a program operating on the host computer). Illustratively, multiple storage units such as caches or other memory areas are maintained on the device, with each cache having an assigned weight or measure corresponding to one of the multiple data priorities. The data (e.g., packets, portions of packets) are scheduled for transmission by the NIC according to the assigned priority. Thus, in one implementation a number of data packets having one priority may be scheduled for transmission before packets of another priority are scheduled.

A round-robin scheme may be applied to service each cache in turn, with the amount of information being processed in each cache's turn dependent upon the weight assigned to the cache. Weights may be dynamic so that they may be adjusted while the NIC continues operating. Thus, if data having a particular priority is not afforded sufficient resources (e.g., transmission bandwidth), the cache weights may be dynamically modified to improve service of a particular class of data. In one embodiment, weights reflect the amount of data that may be processed or scheduled for transmission in one cache turn.

In a present embodiment of the invention outgoing packets may be represented in the caches by data structures termed descriptors. Illustratively, each descriptor includes data and/or flags to, among other things: identify a location (e.g., in host memory) of an associated data packet or portion of a packet, indicate whether an associated packet portion is the beginning or end of a packet, reveal the priority of quality of service assigned to the packet, etc.

The system and methods of an embodiment of the present invention may be combined with a network interface circuit such as that described in U.S. patent application Ser. No. 09/259,765, entitled "A High-Speed Network Interface," filed Mar. 1, 1999, which is hereby incorporated by reference.

A Network Interface Circuit According to One Embodiment of the Invention

FIG. 1 is a block diagram of a network interface circuit (NIC) configured in accordance with one embodiment of the present invention. NIC 100 is configured to interface host computer 150 with shared communication link 130, which, in the illustrated embodiment, may be a network. Host computer 150 may be a desktop, laptop, handheld or any other type of computer or computing device capable of generating data for transmission over link 130. Network 130 may conform to any topology and protocols compatible with NIC 100 and host 150. In particular, NIC 100 is configured for TCP/IP (Transport Control Protocol/Internet Protocol) and Ethernet in this embodiment. In alternative embodiments NIC 100 may be configured for and compatible with virtually any communication protocol(s). Although a present embodiment of the invention is described for use with a network interface circuit, alternative embodiments of the invention may be implemented in other forms of communication devices and interfaces.

As described previously, NIC 100 accepts data from host 150 and schedules the data for transmission over shared link 130, via transmit queue 120, based on the priorities associated with the data. The data may be received from host 150 in packet form or, alternatively, may be formed into packets on NIC 100. In one particular embodiment a collection of outgoing data (e.g., an amount sufficient for one packet, as defined by an active communication protocol) may be divided into multiple portions for transfer to and processing by NIC 100.

In FIG. 1, NIC 100 incorporates a plurality of memories (e.g., caches). In this particular embodiment NIC 100 includes one memory for each priority level that may be assigned to outgoing data. Thus, FIG. 1 demonstrates caches 102a, 102b, 102c and 102d corresponding to four different qualities or priorities of service offered by host 150. Alternative embodiments of the invention may incorporate virtually any number of caches and qualities of service.

In the presently described embodiment of the invention host data ready to be transferred to NIC 100 is stored in host memory until NIC 100 schedules it for transmission over shared link 130. Prior to its retrieval for transmission, the data is represented in the caches of NIC 100 by data structures termed descriptors. Each descriptor stores information concerning one portion of data (e.g., one packet or packet portion) to be transferred, such as a pointer or host memory address identifying where the data is stored, the amount of data in the portion, a flag indicating whether the data is the beginning or ending of a packet, etc.

In the illustrated embodiment, descriptors associated with outgoing packets or portions of outgoing packets are received and stored in caches 102a–102d on the basis of the packets' assigned priorities or qualities of service. A packet's priority may be assigned by an application or utility program that generated the outbound data, by a device driver for the NIC that operates on the host computer, or in some other manner.

Further, in the illustrated embodiment each of caches 102a–102d corresponds to a class-based queue maintained on host 150. Illustratively, the host computer may maintain a separate queue for each priority level. Thus, the class-based queues store the outgoing data and/or descriptors on the host until the descriptors are accepted into one of the NIC caches.

In one embodiment of the invention each cache entry is sixty-four bits in size, exactly matching the size of a descriptor. Further, each cache may store up to four descriptors at one time, which are removed on a FIFO (first-in, first-out) basis. Alternatively, descriptors may be virtually any size and each cache may store any suitable number of entries less than or greater than four. In one alternative embodiment, each cache stores up to eight entries at a time. Removing a descriptor from a cache for processing (e.g., by loader 112 as described shortly) may be a much faster operation than requesting a new descriptor and receiving it into the cache. Thus, it is advantageous for each cache to store a sufficient number of descriptors to prevent it from being emptied (e.g., by loader 112) while there are still descriptors of the same priority waiting on the host computer.

Illustratively, a cache controller (which may be part of loader 112) is configured to load or receive descriptors from host memory into caches 102a–102d. The cache controller may therefore be responsible for notifying other elements of NIC 100 that a cache is empty and/or that no more descriptors of a particular priority are waiting in host memory.

Multiplexer 104 multiplexes descriptors from caches 102a–120d for arbiter 110 and loader 112. When a descriptor is retrieved from a cache and processed by loader 112, the loader requests (e.g., from host memory) the associated data using connection 114. The requested data is received (e.g., from host 150) and fed into queue 120 via connection 122. Connection 114 may also be used to request one or more descriptors be loaded into a cache.

For purposes of communicating with host 150, loader 112 may incorporate or interact with a DMA (Direct Memory Access) controller that may, in turn, interface with a controller (e.g., a PCI (Peripheral Component Interconnect) controller) on the host computer. For example, a PCI controller on host 150 may accept a DMA request from the DMA controller and retrieve the desired packet over a PCI bus. The scope of the invention is not limited by the manner or means with which data are retrieved from the host computer or prepared for and transmitted over link 130.

Transmit queue 120, in one embodiment of the invention, comprises RAM (Random Access Memory) and operates in FIFO (First-in, First-out) fashion. In alternative embodiments of the invention, queue 120 may include virtually any form of memory device for temporarily storing a packet for transmission across link 130. In one embodiment of the invention data stored in transmit queue 120 are processed (e.g., packetized) and transmitted by a Medium Access Controller (MAC) or suitable device operating at the physical link layer of an applicable network protocol stack. For example, data placed into the transmit queue may be accumulated until a full packet of data is queued, at which time the packet is formatted according to the physical link layer protocol and transmitted across the link. In one embodiment of the invention, if the DMA bandwidth is sufficient then transmission of a packet may begin before the entire packet is stored in transmit queue 120. For example, if the portion of a packet already stored in the transmit queue exceeds a certain threshold (e.g., measured as an amount of data or percentage of the packet), then transmission of the packet may begin. The threshold may be determined by considering the DMA bandwidth and the bandwidth of link 130.

Arbiter 110 manages the retrieval of descriptors from caches 102a–102d. In doing so, arbiter 110 attempts to ensure the desired priority or quality of service for each class of data by enforcing corresponding weights associated with each cache and/or descriptor. In the illustrated embodiment of the invention, arbiter 110 not only determines the cache from which a descriptor is to be received and processed by loader 112, but may also determine what type (e.g., which priority level) of descriptor should next be retrieved from the host computer and placed into the appropriate cache.

Illustratively, loader 112 initiates the loading of a new descriptor into NIC 100 by contacting host 150 through connection 114. In particular, arbiter 110 may identify which type of descriptor (e.g., by associated priority or quality of service) is to be loaded next. As already described, loader 112 also retrieves packet data corresponding to a descriptor retrieved from one of caches 102a–102d. Loader 112 may include a cache controller (not separately depicted in FIG. 1) for purposes of managing the caches.

Thus, in one embodiment of the invention one may view the functions of arbiter 110 as involving the servicing of caches 102*a*–102*d* in turn (e.g., in round-robin fashion). A set of cache weights may affect how long a cache is serviced or how much data (e.g., how many packets) may be scheduled for transmission during a cache turn. The functions of loader 112, in contrast, may include keeping caches 102*a*–102*d* populated with descriptors and loading data for transmission.

The various modules and functions illustrated in FIG. 1 may be combined and implemented in one ASIC (Application-Specific Integrated Circuit) or may be divided among multiple components of NIC 150. Also, FIG. 1 does not depict various other components and modules that may be included in a network interface circuit such as NIC 100.

Scheduling Packets for Transmission According to Dynamic Weights

In a present embodiment of the invention, data to be transmitted over a communication link shared between multiple applications operating on a host computer are segregated according to priority, scheduled for transmission according to their priority and then placed into packet form prior to transmission. For example, one electronic mail message or video frame may be segmented into multiple data portions, each of which is represented by a separate descriptor in one of caches 102*a*–120*d* (shown in FIG. 1) and then formed into one or more network packets. As described in the preceding section the priority associated with a type of data (e.g., data from a particular application) may be reflected in a weight associated with the data's cache in NIC 100. Illustratively, a cache weight may indicate the relative portion of the transmission bandwidth (i.e., over link 130) that is to be granted to this type of data or an amount of data that may be transmitted or scheduled for transmission during one cache turn.

Each data portion is stored in host memory and represented within the priority caches of the network interface device by a descriptor. While awaiting transfer to the NIC, however, descriptors may be segregated according to the priority or quality of service of their associated data. In particular, for each descriptor cache on the NIC (e.g., caches 102*a*–102*d* in FIG. 1), a separate queue may be maintained on the host computer.

Therefore, in one embodiment of the invention real-time audio or visual data may be assigned a relatively high priority, indicating that it should receive preferential treatment in the network interface device. Descriptors for packets of the real-time data are placed in a first host queue (i.e., for transfer to the network interface device), which may be termed Queue1 to reflect that the real-time data is the highest priority data to be sent from the host computer. Illustratively, the next highest quality of service may be typified by web or Internet traffic. For example, the host computer may be a web server serving data to users via a network such as the Internet. Descriptors for packets of web traffic would thus be placed in a host queue named Queue2. Likewise, a third quality of service may be appropriate for "best effort" type traffic, which has little (if any) time sensitivity. Descriptors for this type of data (e.g., electronic mail, file backup) may be stored in a host queue named Queue3. Finally, low priority packets (e.g., packets containing network management data) may be represented by descriptors placed in a queue named Queue4. For data not assigned a specific quality of service, a default host queue (e.g., best effort or Queue3) may be used.

In this embodiment of the invention a one-to-one mapping exists between class-based queues on a host computer and descriptor caches on the network interface device or other communication device. Thus, in FIG. 1, if caches 102*a*–102*d* correspond to host queues Queue1 through Queue4, respectively, cache 102*a* will normally have the highest weight and cache 102*d* the lowest. However, a one-to-one arrangement is not necessary as long as descriptors can be segregated according to the priority of their associated data and placed into a corresponding descriptor cache on the device. Thus, virtually any memory structure may be used to store descriptors awaiting transfer to the network interface device as long as the priority of their associated data are readily ascertainable.

Each descriptor cache on the network interface device is assigned a dynamic weight, which may be adjusted during the processing and transmission of data. In particular, each weight corresponds to the priority of the data represented by the descriptors stored in the cache. Illustratively, each weight determines how many descriptors in one cache may be processed (e.g., and scheduled or queued for transmission) before a next cache is to be serviced. Thus, a weight may identify a number or range of descriptors, data portions or packets, an amount of network traffic (e.g., in terms of bytes or other measure), a percentage of time, processing cycles or bandwidth, etc. In one embodiment of the invention each cache weight represents a number of bytes of data that may be transmitted (or scheduled for transmission) during one turn.

In one embodiment of the invention a communication device (e.g., NIC 100 of FIG. 1) begins receiving and processing descriptors from the highest priority cache when reset or initialized. Thus, loader 112 of NIC 100 retrieves and processes descriptors from cache 102*a* until arbiter 110 indicates that the number of bytes of data represented by descriptors in cache 102*a* that have been queued for transmission has reached or exceeded the maximum allowed (e.g., the cache weight). Loader 112 then begins servicing cache 102*b* until its maximum amount of data has been processed, after which cache 102*c* is serviced, then cache 102*d*, then cache 102*a*, etc. A cache's turn to be serviced may also end if the cache becomes empty of descriptors, particularly if no descriptors associated with the cache's priority or quality of service are ready in host memory.

In this embodiment a cache deficit is formed when the number of bytes of data scheduled or queued for transmission from descriptors in a cache in one turn exceed the maximum allowed. Illustratively, the magnitude of the deficit is determined by the number of bytes by which the cache weight or allowable number of bytes is exceeded. Illustratively, the next time that cache is serviced, the maximum number of bytes that should be processed will be decreased by the deficit. A deficit may be carried forward one or more turns in order to enforce data priorities over a period of time.

A cache weight may thus be viewed as indicating the maximum amount of data (e.g., a maximum burst size) that may be scheduled for transmission in one turn of that cache. In the illustrated embodiment of the invention the processing of descriptors from one cache will only stop at the end of a packet. The first and/or last descriptor associated with a packet may be identified by a flag in the corresponding descriptor(s). If the maximum burst size for a cache (e.g., the cache weight) is exceeded in order to finish scheduling a packet for transmission, the allowed burst for the cache's next turn is reduced. Illustratively, the allowed burst for the next turn is set to the maximum burst (e.g., cache weight) minus the amount by which the previous allowed burst was exceeded. Deficits are cumulative and may increase or decrease each turn depending on whether the amount of data scheduled for transmission exceeds or falls short of the maximum burst size. Illustratively, if a cache weight is modified during operation of the network interface device, its deficit, and possibly all deficits, may be reset to zero.

In one embodiment of the invention cache weights are stored in programmable registers on the communication device, which registers may be modifiable by a software driver operating on the host computer. Thus, if the driver determines that additional transmit bandwidth is needed for a particular class or priority of data, it may dynamically re-program the registers to adjust the weights. As described below, if a cache weight is changed, the current scheme for servicing the caches may be terminated and servicing restarted with the cache associated with the highest priority data. Illustratively, a cache turn will not end during the transmission or scheduling for transmission of a packet. That packet will be completed before the cache turn ends.

In an embodiment of the invention in which cache weights indicate amounts of data (e.g., in bytes) that may be scheduled in each cache turn, for relatively high priority data an illustrative cache weight may be one or more times the number of bytes in a maximum, average, median or other suitable measure of a packet size (e.g., as determined by an applicable network protocol stack). A cache weight for a low priority cache may be very low, such as one, indicating that the low priority data need only be sent when virtually no higher priority data are available. In an embodiment of the invention in which no less than one full packet of data will be scheduled for transmission from a cache, any weight that is less than a packet size should ensure that only one packet of data is sent during each turn that cache is serviced. Thus, in the weighting scheme described here, by having a relatively high weight for a high priority cache more data may be scheduled for transmission before a deficit is developed and/or the servicing turn for that cache is terminated. Conversely, having a low weight for a low priority cache will cause the low weight to be quickly exceeded, thus terminating the servicing of the low priority cache relatively early.

In the embodiment of the invention depicted in FIG. 1, arbiter 110 manages the servicing of the different caches. Thus, arbiter 110 includes registers or other storage areas for tracking the amount of data processed through each cache in a turn (e.g., number of descriptors or bytes of data), storing cache deficits and weights and any other information that may facilitate the preemptive scheduling of data. Arbiter 110 may also inform loader 112 or a separate cache controller as to the class or priority of descriptor that should be retrieved from the host and placed into the corresponding cache (e.g., to keep the cache from being depleted).

Figure 2A:
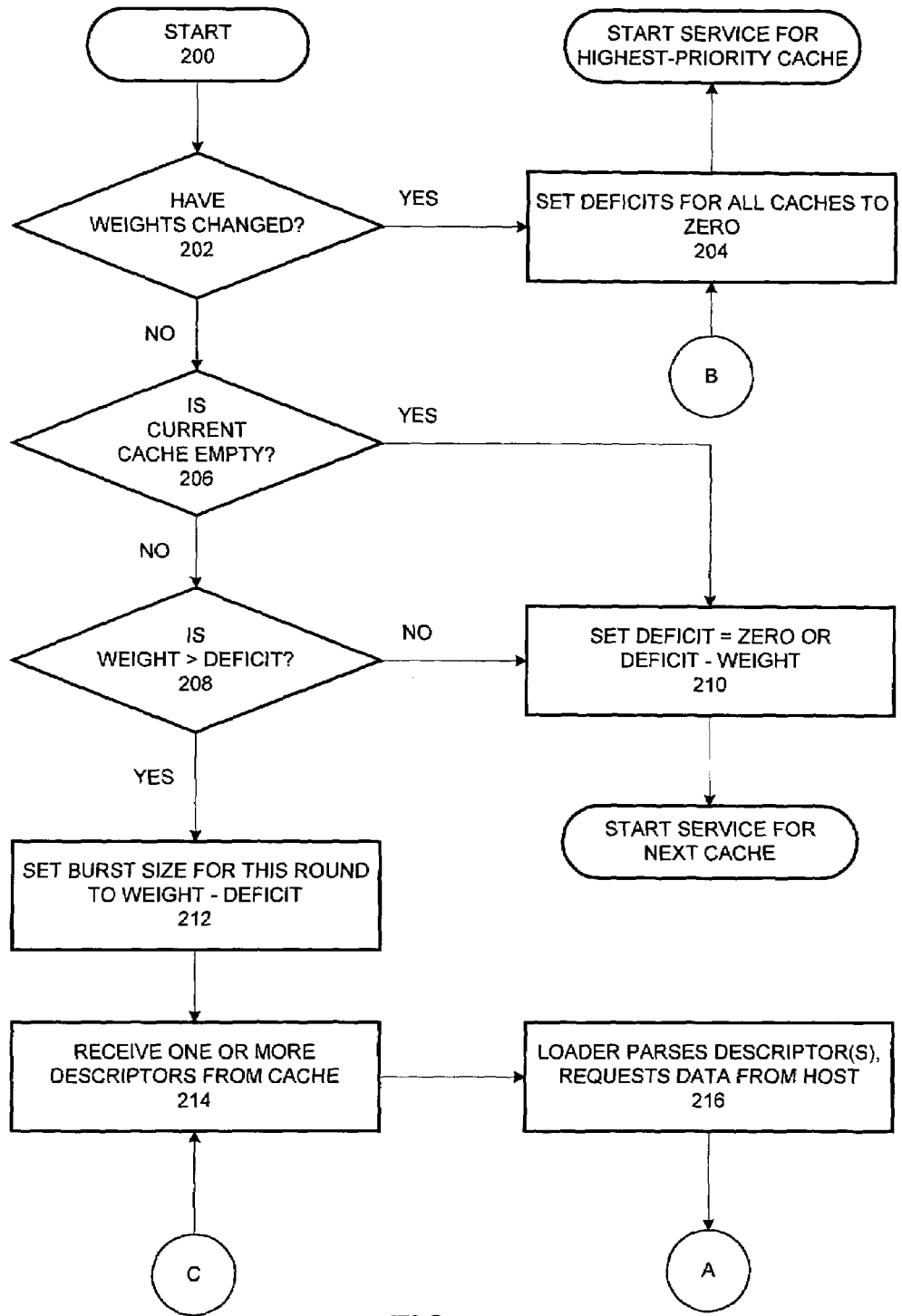
FIGS. 2A–B are flowcharts illustrating one method of scheduling data for transmission over a communication link according to the priority of the data in accordance with an embodiment of the invention.
Figure 2B:
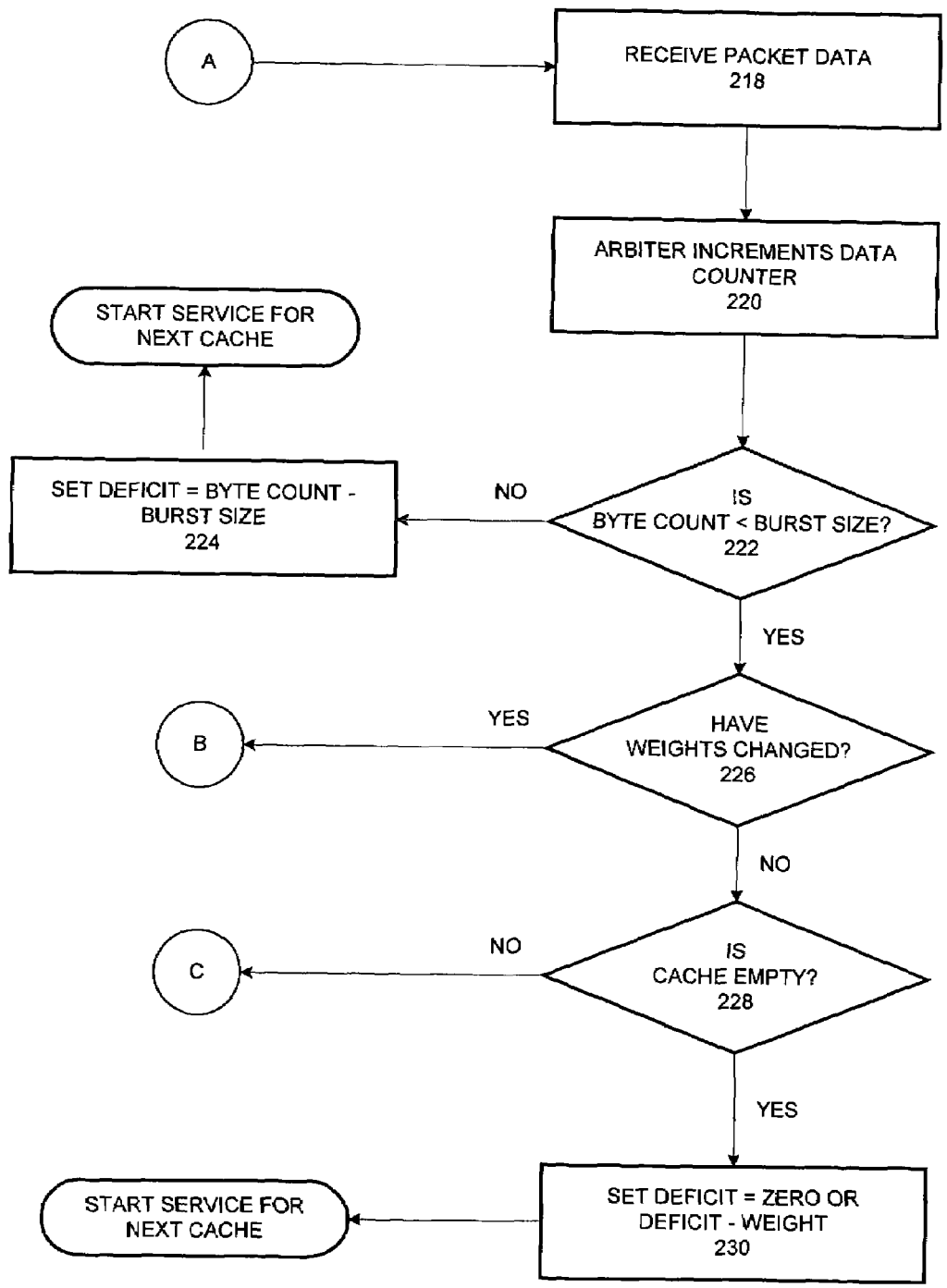

FIGS. 2A–B demonstrate one method by which arbiter 110 adaptively schedules class-based or prioritized data for transmission over a communication link according to one embodiment of the invention. The illustrated method is intended for use with a communication device such as NIC 100 of FIG. 1.

FIGS. 2A–B illustrate the servicing of one of multiple caches on NIC 100. Thus, after the illustrated method is performed for one cache, the same or a similar method is performed for the next cache, and the next, etc. As already mentioned, in one embodiment of the invention the highest priority cache is automatically serviced first after the network interface device is reset or initialized. Thereafter, each cache may be serviced in a round-robin fashion according to its assigned weight or priority.

In FIGS. 2A–B, state 200 is a start state in which, or prior to which, initial weights are assigned to each cache within the network interface device. In this embodiment of the invention cache weights reflect the maximum burst size or the maximum amount of data (e.g., number of bytes) of one priority that may be scheduled for transmission before scheduling data of a different priority. Maximum burst sizes may, as already described above, be exceeded in order to finish processing a packet. An initial set of weights in this embodiment may be some multiple of the maximum packet size (e.g., X*1516) for the highest priority cache, the maximum packet size (e.g., 1516) for the second priority cache, some portion of the maximum packet size (e.g., 758) for the third priority cache, and some low figure (e.g., 1–8), much less than the maximum packet size, for the lowest priority cache.

In addition, in state 200 one or more components of NIC 100 may initialize or reset counters, registers or other data structures used to facilitate the processing of descriptors and the scheduling of associated data for transmission. For example, in one embodiment of the invention arbiter 110 keeps track of the amount of data (e.g., number of bytes or packets) queued for transmission during each cache turn. In state 200, a counter used for this purpose for the present cache turn is reset to zero.

In state 202 the arbiter determines whether a cache weight has been changed. Illustratively, the arbiter examines a flag that indicates if a host driver has altered one or more cache weights. If the flag is set, the arbiter reads the new weights from programmable registers and clears the flag. If no weights have changed the illustrated procedure continues at state 206. Otherwise, if one or more weights have been changed, then in state 204 each cache deficit is reset to zero to prevent an old deficit from affecting the new scheduling scheme.

After state 204, the illustrated procedure returns to commence servicing the cache(s) associated with the highest priority data. Thus, if a relatively low priority cache was being serviced, it may be preempted and attention redirected to the highest priority cache. In an alternative embodiment of the invention, however, after a change in cache weights a new servicing scheme may begin with a cache other than the highest priority cache.

In state 206, it is determined whether the current cache is empty. In one embodiment of the invention a cache controller, which may be part of the loader, may inform the arbiter that a cache is empty. A register may be maintained to indicate the number or presence of descriptors in host memory (e.g., the class-based queues described above). Illustratively, the cache controller is configured to receive or transfer a descriptor from host memory for a cache. The cache controller may retrieve descriptors from the host whenever a cache is nearing empty or may retrieve descriptors from the host as descriptors are being retrieved and processed from a cache. If the current cache is empty, the procedure continues at state 210.

Otherwise (if the cache is not empty), in state 208 the arbiter determines whether the cache weight is greater than the deficit of the current cache. This reveals whether this cache's deficit has become so large as to prevent any descriptors from being processed during this cache turn. If the weight is greater than the deficit, this method continues at state 212. Otherwise, no data will be scheduled for transmission this turn and the illustrated method continues at state 210.

In state 210, no descriptors are processed during this cache turn, so the deficit for the current cache is reduced to the difference between the preexisting deficit and the cache weight (i.e., deficit minus weight). If the deficit minus the weight is less than zero, the deficit is set to zero.

It may be observed that state 210 is reached if no data are retrieved and scheduled for transmission during the present cache turn. This may occur if, for example, the cache is empty or the cache deficit exceeds the cache weight. For example, if a low priority cache's weight is relatively small, it may happen that the size of a small number of low priority packets (or even one, such as a jumbo Ethernet packet) may exceed the weight. As a result, no more of the same priority descriptors will be processed or have their data scheduled for transmission until the deficit is reduced to a level below the cache weight.

After state 210, the arbiter finishes with the current cache and proceeds to servicing the next cache. Illustratively, in the embodiment of FIG. 1, caches 102a–102d are serviced in round-robin fashion, with cache 102a being serviced after cache 102d.

In state 212, the actual amount of data (e.g., number of bytes) that should be transmitted (or queued for transmission) during the present turn for the current cache is determined by subtracting the cache deficit from the cache weight. This value may be termed the burst size. It will be seen that if the deficit is zero, the burst size is equal to the cache weight, which may be considered the maximum burst size for the cache.

In state 214, one or more descriptors from the current cache are received by arbiter 110 and loader 112 through multiplexer 104. In particular, arbiter 110 instructs multiplexer 104 to accept a set of descriptors describing a full packet of data. For example, where descriptors contain flags indicating the start and end of packet, the arbiter allows a first packet (having a start of packet flag set) to be received and directs the multiplexer to accept additional descriptors until one having an end of packet flag set is received. State 214 may comprise a number of individual states in which the multiplexer accepts a descriptor that is then examined by the arbiter to determine whether to accept another one.

In state 216, loader 112 parses the descriptor(s) to retrieve information (e.g., memory address or buffer identifier) identifying the packet data represented by the descriptor(s). Loader 112 then passes a request to host 150 for the packet data. This may comprise a series of requests for the individual packet portions associated with the separate descriptors, or may be a single request. As described earlier, the request(s) may be handled by various components (e.g., DMA controller, PCI controller) not depicted in FIG. 1. Alternatively, loader 112 may incorporate the necessary component(s) (e.g., DMA controller) that NIC 100 requires in order to submit the data retrieval request(s) to the host computer. During state 216, a cache controller (which may be part of loader 112) may act to have one or more descriptors loaded into the cache from host memory.

In state 218 host 150 provides the requested data to NIC 100, which is placed in transmit queue 120. In an embodiment of the invention in which loader 112 is configured to interface with the host computer (e.g., by incorporating a DMA controller), the data may be received by the loader (e.g., via connection 114) for placing in the transmit queue. The packet data may be loaded into the queue one portion at a time (e.g., wherein each portion is identified by one descriptor) or may be loaded all at once. Illustratively, the packet data is coded as necessary for transmission over the communication link.

In state 220, arbiter 110 increments a counter for the current cache according to the amount of data (e.g., number of bytes) associated with the received descriptor(s). Illustratively, each descriptor includes a field that reports an amount of data. Arbiter 110 thus tracks the amount of data scheduled for transmission during this cache turn.

In state 222 the arbiter determines whether the amount of data associated with descriptors processed during this cache turn and queued for transmission is less than the size of the allowed burst for the turn. If this is the case, the illustrated procedure advances to state 226 to continue the turn. Otherwise, the burst size has been exceeded and the method continues at state 224.

In state 224 the current cache's deficit is set to the amount by which the allowed burst size was exceeded (e.g., amount of data queued during this turn minus burst size). After state 224, arbiter 110 and loader 112 begin servicing the next cache.

In state 226, arbiter 110 or loader 112 again determines whether a cache weight has been dynamically modified. If so, the procedure returns to state 204 to reset all cache deficits and re-commence serving the highest-priority cache. Otherwise, the illustrated method continues at state 228. It can thus been seen that, in the illustrated procedure, every time a packet of data is scheduled for transmission, NIC 100 determine if cache weights have been changed. This facilitates preemption and ensures that new scheduling schemes are implemented as soon as possible.

In state 228 it is determined whether the current cache is empty. If so, then there are no more descriptors to process during this cache turn and the illustrated method proceeds to state 230. Otherwise, if there is at least one more descriptor to process, the method returns to state 214.

Illustratively, a cache controller ensures that as long as descriptors matching the priority or quality of service of the cache being service are available in host memory (e.g., a host queue), that they are continually loaded into the cache. If the corresponding host queue becomes empty before the arbiter determines the cache's turn is over (e.g., based on an amount of data queued for transmission), the cache controller informs the arbiter that no more descriptors are available, in which case the cache turn ends.

In state 230 the deficit for the current cache is reduced because the amount of data queued for transmission during this turn was less than the burst size. In other words, the current cache is emptied of descriptors before the amount of data queued for transmission (e.g., the byte count) equals the burst size. In this embodiment of the invention the deficit is reduced by the size of the allowed burst. Illustratively, if the burst size portion is greater than the deficit, then the deficit is reset to zero. In one alternative embodiment of the invention, however, in state 230 the deficit may only be reduced by the unused portion of the burst size. After state 230, servicing of the current cache is terminated and servicing of the next cache is commenced.

The method depicted in FIGS. 2A–B describes just one exemplary procedure for servicing one cache for one turn. Numerous similar methods may be derived from this one without exceeding the scope of the invention. For example, the order in which states 216 through 220 are performed may be altered without significantly affecting the procedure.

In addition, the method illustrated in FIGS. 2A–B may be modified to determine whether one or more other caches not being serviced are empty. If so, then a cache that is not empty (e.g., one being serviced) may receive more than one turn. This helps prevent NIC 100 from continually cycling through empty caches and delaying the processing of descriptors waiting in a non-empty cache.

Host Computer Operations

This section describes compatible class-based queuing of outgoing data on a host computer system in one embodiment of the invention. In this embodiment the host maintains a number of class-based queues for separating data according to their priorities. Illustratively, the number of class-based queues may be equal to the number of descriptor caches maintained on a compatible communication interface device, as described in the preceding sections.

A compatible host computer system may incorporate multiple processors, each of which maintains one thread for executing a series of instructions for inserting data into each of the multiple class-based queues. In general, however, a software driver for controlling the communication interface device may be configured to manage the interface between the communication interface device and the multiple class-based queues. Individual application/utility programs operating on the host computer may generate data to be transmitted across the communication link. The data may receive some initial processing through a compatible protocol stack and then be passed off to the driver, which illustratively operates between the communication interface device and host-resident layers of the protocol stack (e.g., layers three and four). In particular, in an embodiment of the invention in which the communication link is a wide-area network such as the Internet (or a connection to the network), the data may be processed in accordance with protocols such as the Transport Control Protocol (TCP) and Internet Protocol (IP) before being forwarded to the communication interface device via the software driver. However, because the interface device operates at layer two (e.g., the data link layer) in this embodiment, the higher layer protocols do not restrict the operation or scope of the invention.

Data placed in the class-based queues is divided and described by descriptors drawn from descriptor rings. Illustratively, one descriptor ring composed of multiple descriptors is maintained for each class-based queue. Each descriptor contains various fields and/or flags to facilitate the transmission of the associated portion of data. For example, in one embodiment of the invention each descriptor may include one or more of the following items: a pointer to a memory area (e.g., buffer) in which the data portion is stored; the length of the buffer or size of the data portion; flags indicating whether the data is the start or end of a packet.

In one embodiment of the invention the handling of outbound data is expedited by employing a copy-on-write method of transferring outgoing user data from the user's memory space to kernel (e.g., operating system) memory space from where it is forwarded to the communication interface device. In particular, this method avoids having to copy the user data from a user memory buffer to a kernel buffer before allowing the hardware (e.g., a NIC) to retrieve the data. Instead, in this method the hardware (e.g., NIC 100) can DMA the data directly from the user's buffer.

In order to avoid corrupting the outgoing data, the user's permission to write to the buffer (or the memory page containing the buffer) is denied until after the hardware retrieves the data. Write permission is returned to the user after the data transfer is completed. Multiple user memory buffers may be implemented in order to avoid situations in which the user or an application attempts to modify protected memory before it is available. Further, if data transfers to the hardware are delayed or it is determined that the user/application frequently encounters write faults, this method may be suspended for that user or application.

In this method, because the user memory buffer is used to store the outgoing data, protocol headers (e.g., for TCP and IP) are stored in separate buffers.

As a further enhancement, outbound data may be segmented to further facilitate the flow of the data. As a first step in the segmentation, a collection of outgoing application data (e.g., one page or one user buffer of data) is mapped or page-flipped into kernel space from user space and the user's write permission to that page/buffer is temporarily revoked. Advantageously, the size of the original memory buffer is one memory page, which allows for easier data transfer. As described above, this process avoids a data copy operation which would slow the data flow. The data is then divided into portions of predetermined size (e.g., maximum packet size) inside the buffer. Instead of appending protocol information (e.g., headers) to the data portions as they are processed through the protocol stack, the headers are accumulated in a separate memory area or block. Thus, when the communication interface device (e.g., NIC) requests and retrieves (e.g., via DMA) the packet data, it can all be retrieved at one time from one buffer or memory area. The protocol headers are retrieved with the data from their separate location.

As described in conjunction with the embodiment of the invention depicted in FIGS. 2A–B, when arbiter 110 and loader 112 (shown in FIG. 1) service a cache on NIC 100, they process one full packet's worth of data at a time. The method of processing outbound data just described facilitates the retrieval of a full packet of data at one time.

Figure 3:
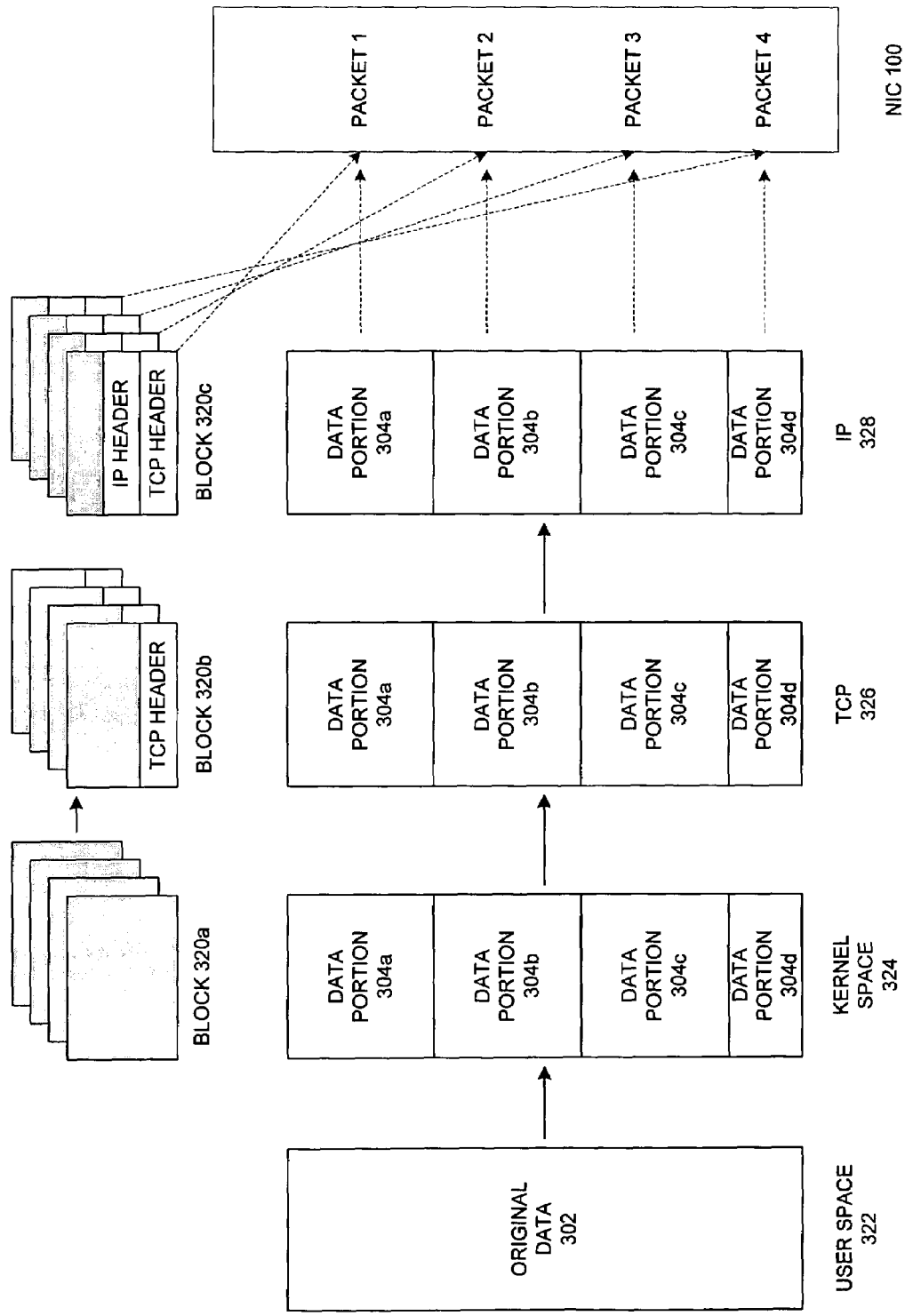
FIG. 3 is a block diagram depicting the segmentation of outgoing data in accordance with an embodiment of the present invention.

FIG. 3 depicts the flow of a set of user data from user space to a communication interface device for transfer onto a communication link in one embodiment of the invention. In this embodiment the protocol stack for outbound data traffic includes TCP at layer four and IP at layer three. Alternative embodiments of the invention are suitable for use with other protocols and protocol stacks.

In FIG. 3, user or application data 302 is generated by a user or application program and is mapped in user memory space 322. The data buffer is then mapped into kernel space 324, where the original data is segmented into multiple data portions 304a–304d. In addition, memory block 320a is reserved for storing protocol headers.

As the outgoing data is processed through layer three and layer four (e.g., TCP and IP) of the protocol stack, the memory block is modified to first include the necessary TCP headers for data portions 304a–304d (reference numeral 320b) and then the IP headers (reference number 320c) and whatever other protocol information or headers (e.g., MAC) may be needed.

The device driver and communication interface device (e.g., NIC 100) then cooperate to combine the headers with the data portions as the data is provided to the device.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. A method of scheduling data for transmission over a communication link based on priorities assigned to the data, comprising:

receiving multiple descriptors at a communication interface device, each of said descriptors describing a data portion having an associated priority;

storing said descriptors in a plurality of memories on said communication interface device, wherein each of said memories is configured to store one or more of said descriptors describing data associated with a predetermined priority;

maintaining a dynamic weight for each of said plurality of memories, wherein each said dynamic weight corresponds to a threshold amount of data associated with said predetermined priority; and servicing said plurality of memories, wherein each said servicing of one of said plurality of memories comprises:

(a) receiving a descriptor from said serviced memory;

(b) retrieving data described by said received descriptor, wherein the amount of retrieved data may exceed said threshold amount;

(c) scheduling said data for transmission via the communication link;

(d) determining whether an amount of data scheduled during said servicing for transmission via said communication link exceeds said threshold amount of data corresponding to said dynamic weight for said serviced memory;

(e) repeating states (a) through (d) for a next descriptor in said serviced memory if said amount of data scheduled for transmission during said servicing is less than said threshold amount of data; and (f) if said amount of data scheduled for transmission exceeds said threshold amount of data, decreasing said threshold for a next servicing of said serviced memory.

2. The method of claim 1, wherein said servicing further comprises:

(g) determining if said serviced memory contains a descriptor.

3. The method of claim 1, wherein said servicing further comprises:

(g) determining whether a dynamic weight for one of said plurality of memories has changed.

4. The method of claim 1, further comprising:

if any of said dynamic weights changes prior to said next servicing, reinstating the pre-decreased threshold for said next servicing.

5. The method of claim 1, wherein said receiving multiple descriptors comprises:

determining if a first memory of said plurality of memories contains less than a predetermined number of descriptors, wherein said first memory is configured to store one or more descriptors describing data associated with a first priority;

issuing a request to a host computer, said request identifying said first memory;

receiving a first descriptor describing a first set of data having said first priority.

6. The method of claim 5, wherein said first descriptor comprises one or more of:

an identifier of a storage area on said host computer containing said first set of data;

an indicator configured to indicate whether said first set of data is a starting portion of data for a packet; and an indicator configured to indicate whether said first set of data is an ending portion of data for a packet.

7. The method of claim 1, further comprising transmitting said data scheduled for transmission via said communication link before the entire contents of a packet comprising said scheduled data are scheduled for transmission.

8. The method of claim 1, wherein each of said dynamic weights is dynamically modifiable to adjust said threshold amounts of data.

9. The method of claim 1, wherein the communication interface device is a network interface circuit and the communication link is a network.

10. A method of scheduling data for transmission over a communication link by servicing, in turn, multiple memories associated with data having different priorities, comprising:

storing in a first memory a first set of descriptors associated with data having a first priority, wherein said first memory has a first dynamic weight corresponding to a first threshold amount of data;

storing in a second memory a second set of descriptors associated with data having a second priority, wherein said second memory has a second dynamic weight corresponding to a second threshold amount of data;

in a first servicing turn of said first memory:

determining whether one of said first weight and said second weight has changed;

receiving a first descriptor from said first memory;

parsing said first descriptor to identify a first data portion having said first priority;

retrieving said first data portion from a host computer memory;

scheduling said first data portion for transmission onto the communication link; and determining whether an amount of first priority data exceeding said first threshold has, during said first servicing turn, been scheduled for transmission; and if said first threshold has been exceeded, maintaining a first deficit to determine how much less than said first threshold of data may be scheduled during a subsequent servicing turn of said first memory, wherein said first deficit is initially proportional to said excess.

11. The method of claim 10, further comprising, if said amount of first priority data scheduled for transmission during said first servicing turn exceeds said first threshold:

decreasing said first threshold for a subsequent servicing of said first memory.

12. The method of claim 10, wherein said first deficit is set to zero if one of said first weight and said second weight has changed.

13. The method of claim 10, wherein said first servicing turn further comprises: determining whether said first memory is empty.

14. The method of claim 13, wherein said first servicing turn is terminated if, during said first servicing turn, either said first memory is determined to be empty or said amount of first priority data scheduled for transmission exceeds said first threshold.

15. The method of claim 10, wherein said determining comprises:

incrementing a data counter for each unit of first priority data scheduled during said first servicing turn; and comparing said data counter to said first threshold.

16. The method of claim 15, wherein said data unit is a byte.

17. The method of claim 10, further comprising servicing said second memory in a second turn, wherein said servicing said second memory comprises:

until at least one of:

said second memory is determined to be empty;

one of said first weight and said second weight change; and an amount of data scheduled during said second turn for transmission over the communication link exceeds the lesser of said second threshold and said second threshold minus a second deficit, wherein said second deficit corresponds to an amount of data by which said second threshold was exceeded in one or more earlier servicing turns of said second memory;

repeatedly:

receiving from said second memory a second descriptor describing a second set of data having said second priority;

retrieving said second set of data;

scheduling said second set of data for transmission via the communication link; and tracking an amount of data scheduled during said second turn by adding the size of said second set of data to a measure of data previously scheduled during said second turn.

18. The method of claim 17, wherein:

said first memory corresponds to data having a highest priority; and if one of said first servicing turn and said second servicing turn terminates because one of said first dynamic weight and said second dynamic weight change, said first memory is the next memory serviced.

19. The method of claim 10, wherein the method is performed in a network interface circuit and the communication link is a network.

20. The method of claim 10, wherein said first dynamic weight is approximately equal to a maximum packet size of the communication link.

21. The method of claim 10, wherein said second dynamic weight is approximately equal to one.

22. A computer readable storage medium storing instructions that, when executed by a computer, cause the computer to perform a method of scheduling data for transmission over a communication link by servicing, in turn, multiple memories associated with data having different priorities, the method comprising:

storing in a first memory a first set of descriptors associated with data having a first priority, wherein said first memory has a first dynamic weight corresponding to a first threshold amount of data;

storing in a second memory a second set of descriptors associated with data having a second priority, wherein said second memory has a second dynamic weight corresponding to a second threshold amount of data;

in a first servicing turn of said first memory:

determining whether one of said first weight and said second weight has changed;

receiving a first descriptor from said first memory;

parsing said first descriptor to identify a first data portion having said first priority;

retrieving said first data portion from a host computer memory;

scheduling said first data portion for transmission onto the communication link; and determining whether an amount of first priority data exceeding said first threshold has, during said first servicing turn, been scheduled for transmission; and if said first threshold has been exceeded, maintaining a first deficit to determine how much less than said first threshold of data may be scheduled during a subsequent servicing turn of said first memory, wherein said first deficit is initially proportional to said excess.

23. A communication interface device for transmitting prioritized data over a communication link, comprising:

a first memory configured to store a descriptor corresponding to a first packet having a first priority, said first memory being associated with a first weight, wherein said first weight corresponds to a first preferred amount of data to be scheduled, during a first servicing turn of said first memory, for transmission over a communication link;

a second memory configured to store a descriptor corresponding to a second packet having a second priority, said second memory being associated with a second weight, wherein said second weight corresponds to a second preferred amount of data to be scheduled, during a first servicing turn of said second memory, for transmission over said communication link;

a transmission queue into which one of said first packet and said second packet is placed for transmission over said communication link; and an arbiter configured to:

monitor a first amount of data retrieved during said first servicing turn of said first memory and a second amount of data retrieved during said first servicing turn of said second memory;

if said amount of data retrieved during said first servicing turn of said first memory exceeds said first preferred amount of data, decrease said first preferred amount of data by a deficit between said amount of data and said first preferred amount of data; and if said amount of data retrieved during said first servicing turn of said second memory exceeds said second preferred amount of data, decrease said second preferred amount of data by a deficit between said amount of data and said second preferred amount of data;

wherein said first weight and said second weight are dynamically adjustable; and wherein during said first servicing turn, more than said preferred amounts of data may be retrieved.

24. The communication interface device of claim 23, further comprising a loader configured to retrieve said first packet for placing in said transmission queue during said servicing turn of said first memory.

25. The communication interface device of claim 24, wherein said loader is further configured to load a next descriptor for storage in one of said first memory and said second memory.

26. The communication interface device of claim 24, further comprising a multiplexer configured to pass said descriptor corresponding to said first packet to said arbiter and said loader during said first servicing turn of one of said first memory and said second memory.

27. The communication interface device of claim 23, wherein said arbiter is further configured to determine whether an amount of data placed in said transmission queue during said first servicing turn of said first memory exceeds said first preferred amount of data to be placed in said transmission queue during said first servicing turn of said first memory.

28. The communication interface device of claim 23, wherein said deficit corresponds to an amount of data, beyond said preferred amount of data, that is placed in said transmission queue during said first servicing turn.

29. A computer readable storage medium storing instructions that, when executed by a computer, cause the computer to perform a method of scheduling data for transmission over a communication link based on priorities assigned to the data, the method comprising:

receiving multiple descriptors at a communication interface device, each of said descriptors describing a data portion having an associated priority;

storing said descriptors in a plurality of memories on said communication interface device, wherein each of said memories is configured to store one or more of said descriptors describing data associated with a predetermined priority;

maintaining a dynamic weight for each of said plurality of memories, wherein each said dynamic weight corresponds to a threshold amount of data associated with said predetermined priority; and servicing said plurality of memories, wherein each said servicing of one of said plurality of memories comprises:

(a) receiving a descriptor from said serviced memory;

(b) retrieving data described by said received descriptor, wherein the amount of retrieved data may exceed said threshold amount;

(c) scheduling said data for transmission via the communication link;

(d) determining whether an amount of data scheduled during said servicing for transmission via said communication link exceeds said threshold amount of data corresponding to said dynamic weight for said serviced memory;

(e) repeating states (a) through (d) for a next descriptor in said serviced memory if said amount of data scheduled for transmission during said servicing is less than said threshold amount of data; and (f) if said amount of data scheduled for transmission exceeds said threshold amount of data, decreasing said threshold for a next servicing of said serviced memory.

* * * * *